United States Patent
Bunel et al.

(10) Patent No.: US 9,784,186 B2
(45) Date of Patent: Oct. 10, 2017

(54) DEVICE FOR MOUNTING A SPARK PLUG IN A COMBUSTION ENGINE OF A GAS TURBINE ENGINE

(75) Inventors: Jacques Marcel Arthur Bunel, Thiais (FR); Mario César De Sousa, Cesson (DE); Gilles Ulryck, Ballancourt sur Essonne (FR)

(73) Assignee: SNECMA, Paris (FR)

( * ) Notice: Subject to any disclaimer, the term of this patent is extended or adjusted under 35 U.S.C. 154(b) by 952 days.

(21) Appl. No.: 14/116,807

(22) PCT Filed: May 3, 2012

(86) PCT No.: PCT/FR2012/050984
§ 371 (c)(1),
(2), (4) Date: Feb. 7, 2014

(87) PCT Pub. No.: WO2012/153040
PCT Pub. Date: Nov. 15, 2012

(65) Prior Publication Data
US 2014/0137568 A1     May 22, 2014

(30) Foreign Application Priority Data
May 10, 2011  (FR) ...................................... 11 54018

(51) Int. Cl.
*F02C 7/20*   (2006.01)
*F23R 3/06*   (2006.01)
*F23R 3/60*   (2006.01)

(52) U.S. Cl.
CPC .................. *F02C 7/20* (2013.01); *F23R 3/06* (2013.01); *F23R 3/60* (2013.01); *F23R 2900/00005* (2013.01); *F23R 2900/00012* (2013.01)

(58) Field of Classification Search
CPC ...... F02C 7/20; F23R 3/60; F23R 3/06; F23R 2900/00005; F23R 2900/00012
See application file for complete search history.

(56) References Cited

U.S. PATENT DOCUMENTS

| 4,275,559 A | 6/1981 | Blair |
| 2009/0064657 A1 | 3/2009 | Zupanc et al. |

(Continued)

FOREIGN PATENT DOCUMENTS

| EP | 1 975 512 | 10/2008 |
| FR | 2 926 329 | 7/2009 |

(Continued)

OTHER PUBLICATIONS

International Search Report Issued Sep. 11, 2012 in PCT/FR12/050984 Filed May 3, 2012.

*Primary Examiner* — John C Hong
(74) *Attorney, Agent, or Firm* — Oblon, McClelland, Maier & Neustadt, L.L.P.

(57) ABSTRACT

A device for mounting a spark plug in a combustion chamber of a gas turbine engine includes a chimney including a collar extending radially inwards, a washer fastened on an axial end of the chimney so as to project towards the inside of the chimney, and a bushing forming a spark plug guide and including an inner collar and an outer collar that are axially spaced apart from each other by a cylindrical portion. Each collar extends radially outwards. The bushing is floatingly mounted inside the chimney with its collars axially positioned between the collar of the chimney and the washer. The inner collar comes in operation to bear against the collar of the chimney. The outer collar presents an outside diameter (d1) greater than the inside diameter (d2) of the washer.

8 Claims, 2 Drawing Sheets

(56) References Cited

U.S. PATENT DOCUMENTS

2009/0178385 A1 7/2009 Sandelis
2009/0199564 A1 8/2009 Pieussergues et al.

FOREIGN PATENT DOCUMENTS

FR 2 927 367 8/2009
GB 638 283 6/1950

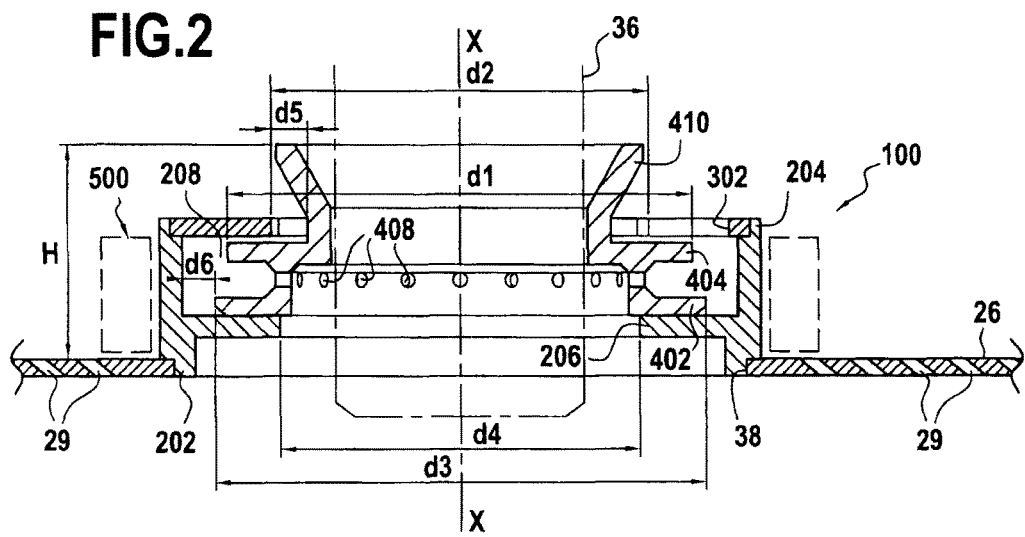
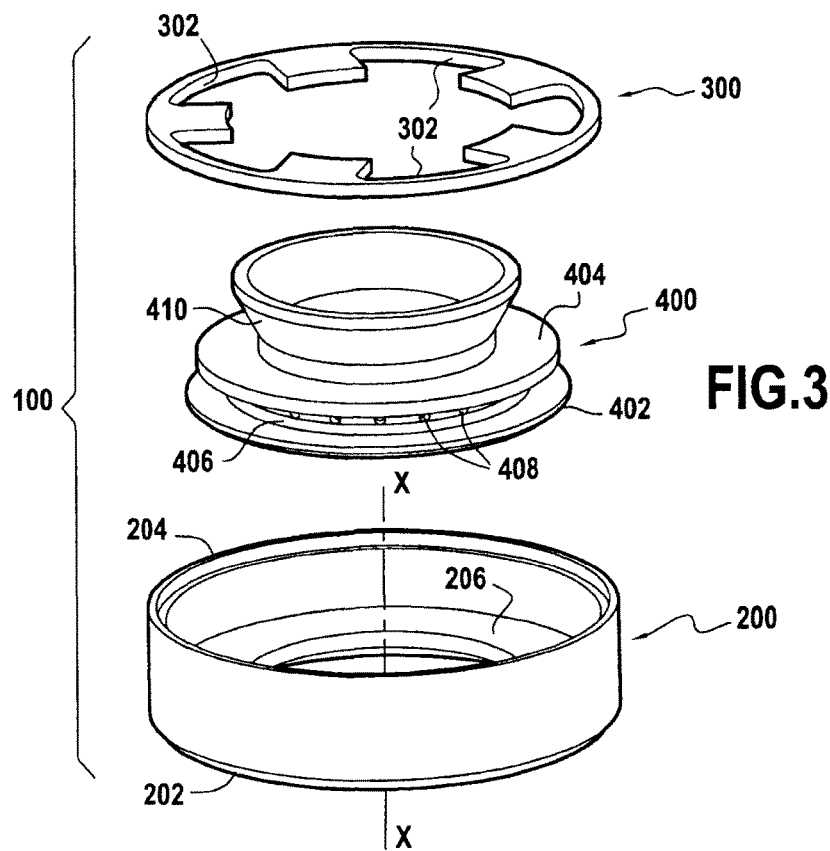

DEVICE FOR MOUNTING A SPARK PLUG IN A COMBUSTION ENGINE OF A GAS TURBINE ENGINE

BACKGROUND OF THE INVENTION

The present invention relates to the general field of ignition systems for a combustion chamber of a gas turbine engine. The invention relates more particularly to a device for mounting a spark plug on a wall of a combustion chamber.

In a gas turbine engine, the combustion chamber is generally constituted by outer and inner longitudinal walls with multiple perforations that are connected together upstream by a transverse wall forming a chamber end wall. These longitudinal walls are fastened downstream to annular casings and they co-operate with the casings to define an annular space that receives air coming from the compressor. The chamber end wall has a plurality of fuel injectors passing therethrough. A fraction of the air coming from the compressor is introduced into the combustion chamber at the injectors, mixed with the fuel, and then burnt in the chamber.

The combustion chamber is ignited by means of one or two spark plugs arranged downstream from the injectors. The spark plugs are typically fastened to the outer casing and they have free ends that pass through the outer wall of the combustion chamber. At its free end, each spark plug is mounted more specifically on the outer wall of the chamber by means of a mounting device that accommodates the relative movements that can exist between the casing and the wall of the combustion chamber on which the spark plug is mounted.

That type of mounting device generally consists in a chimney welded to the outer wall of the combustion chamber, and a spark plug guide that receives the free end of the spark plug and that is floatingly mounted inside the chimney so as to accommodate relative movements between the casing and the wall of the chamber. By way of example, reference may be made to document FR 2 927 367, which describes an embodiment of such a device.

Furthermore, during the operation of making multiple perforations in the walls of the combustion chamber by means of a laser, it is necessary to install protectors around the mounting devices in order to prevent the laser beam from damaging the assembly comprising the chimney and the spark plug guide. Such protectors have a certain amount of thickness, which has an influence on the total height of the mounting device.

Unfortunately, in certain engines, the space available for housing a spark plug mounting device between the outer casing and the outer wall of the combustion chamber is limited. There therefore exists a need for mounting devices that present small radial size, i.e. in which the height of the chimney and spark plug guide assembly is significantly reduced, while still allowing protectors to be installed.

OBJECT AND SUMMARY OF THE INVENTION

A main object of the present invention is to satisfy such a need by providing a device for mounting a spark plug in a combustion chamber of a gas turbine engine, the device comprising a chimney in the form of a cylinder about an axis X-X and having a first axial end for fastening to a wall of a combustion chamber, said chimney including a collar extending radially inwards and centered on the axis X-X, a washer fastened on a second axial end of the chimney opposite from its first end so as to project towards the inside of said chimney, and a bushing forming a spark plug guide and including an inner collar and an outer collar that are axially spaced apart from each other by a substantially cylindrical portion, each collar extending radially outwards, said bushing being floatingly mounted inside the chimney with its collars axially positioned between the collar of the chimney and the washer, the inner collar coming in operation to bear against the collar of the chimney, and the outer collar presenting an outside diameter greater than the inside diameter of the washer.

In operation, under the effect of the pressure difference between the inside and the outside of the combustion chamber, the inner collar of the spark plug guide comes to bear against the collar of the chimney, thereby sealing the device. Furthermore, still in operation, the spark plug guide cannot leave the chimney, given the presence of the washer. Finally, the spark plug guide can move radially inside the space defined between the collar of the chimney and the washer, thus making it possible to accommodate the relative movements that can exist between the outer casing and the outer wall of the combustion chamber on which the device is mounted.

Such a device is remarkable in particular in that the shape of its components and the way they are assembled together makes it possible to provide an assembly that presents small size in height, while still allowing cylindrically-shaped protectors to be installed around the chimney so as to avoid damaging it while making multiple perforations by laser in the walls of the chamber.

Preferably, the cylindrical portion of the bushing has a plurality of impact holes leading into the space defined between the collar of the chimney and the washer and opening out towards the inside of said bushing. Such holes make it possible to provide cooling of the free end of the spark plug by impact.

Under such circumstances, and advantageously, the washer has radial openings for allowing air to penetrate into the space defined between the collar of the chimney and the washer. The radial openings in the washer may be in the form of cutouts formed in the inner periphery of the washer and regularly distributed all around its circumference. By way of example, there are five cutouts.

Also preferably, the radial distance between the inside of the washer and the bushing is greater than the radial distance between the inside of the chimney and the ends of the collars of the bushing. Any contact between the washer and the spark plug guide can thus be avoided so as to avoid any premature wear of the spark plug guide.

Also preferably, the outside diameter of the inner collar of the bushing is greater than the inside diameter of the collar of the chimney.

The invention also provides a combustion chamber for a gas turbine engine having at least one spark plug mounted on one of its walls by means of a device as defined above. The invention also provides a gas turbine engine including such a combustion chamber.

BRIEF DESCRIPTION OF THE DRAWINGS

Other characteristics and advantages of the present invention appear from the following description made with reference to the accompanying drawings that show an embodiment having no limiting character. In the figures:

FIG. 2 is an enlarged view of the FIG. 1 device; and

FIG. 3 is a perspective and exploded view of the device of FIGS. 1 and 2.

DETAILED DESCRIPTION OF AN EMBODIMENT

Figure 1:
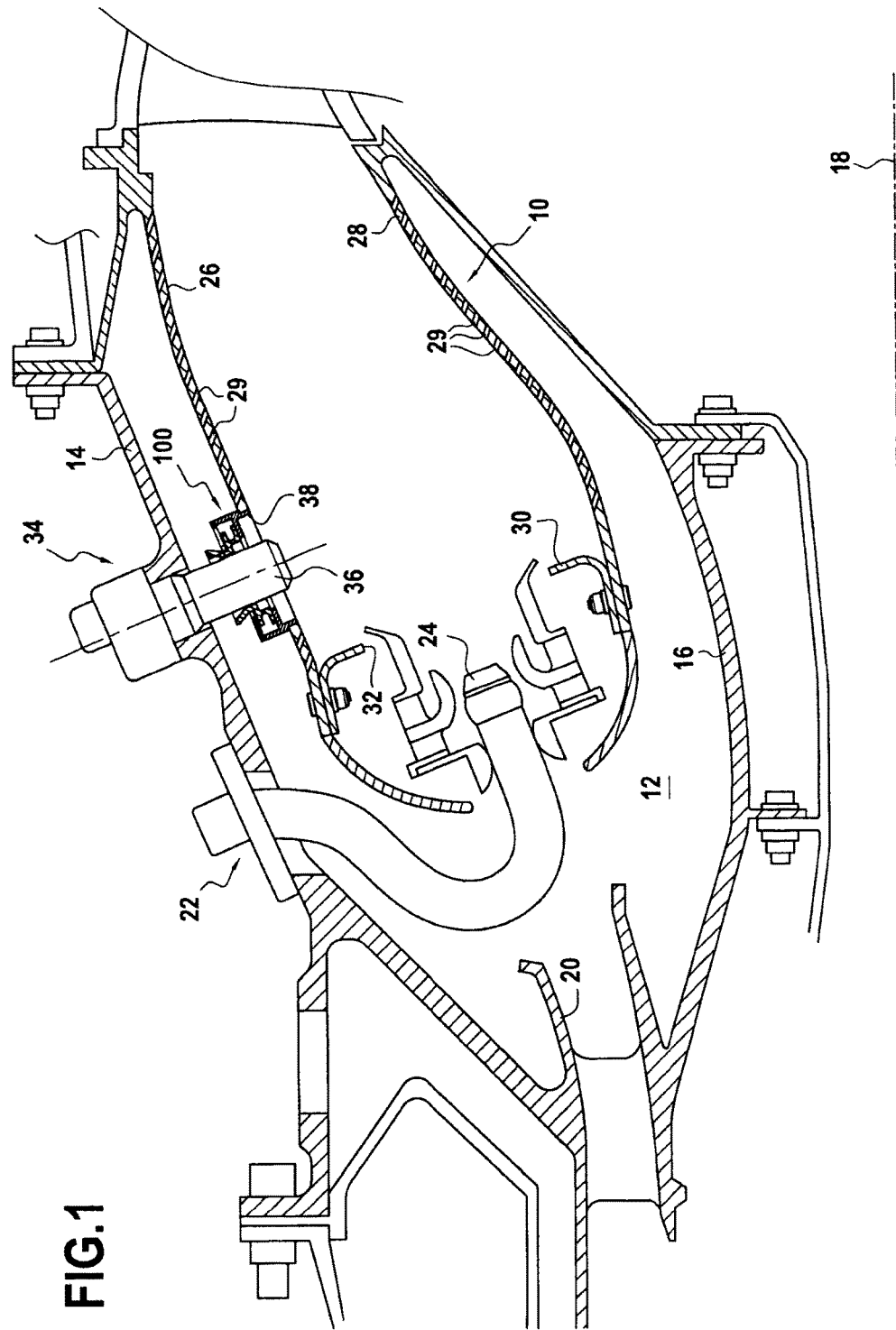
FIG. 1 is a diagrammatic longitudinal section view of a combustion chamber fitted with a device in accordance with the invention.

The invention applies to any type of gas turbine engine combustion chamber, and in particular to an annular type combustion chamber for a turbine engine, as shown in FIG. 1.

The combustion chamber 10 is mounted inside an annular space 12 formed between an outer annular casing 14 and an inner annular casing 16 centered on the longitudinal axis 18 of the turbine engine.

The annular space 12 in which the combustion chamber is mounted receives compressed air coming from a compressor of the turbine engine through an annular diffusion duct 20. This compressed air is intended in particular for ensuring combustion of fuel inside the chamber 10.

Injection systems 22 distributed around the longitudinal axis 18 open out into this annular space 12. Each of the injection systems is provided with a fuel injection nozzle 24 fastened to the outer casing 14.

The combustion chamber 10 is made up of an outer annular wall 26 and an inner annular wall 28 centered on the longitudinal axis 18 of the turbine engine, and each is perforated with multiple holes 29. At their downstream ends, these walls are fastened to the casings 14 and 16, thereby defining the annular space 12. At their upstream ends, these walls are connected together by a transverse wall 30 forming a chamber end wall. This wall has a plurality of openings 32 for passing fuel injection nozzles 24.

The combustion chamber is also provided with at least one ignition system 34. Each ignition system comprises in particular a spark plug 36 fastened to the outer casing 14 downstream from the injection systems 22. The free ends of these spark plugs pass through the outer wall 26 of the combustion chamber so as to penetrate into its inside.

More specifically, each spark plug 36 is mounted on the outer wall 26 of the combustion chamber by means of a mounting device 100 of the invention.

The mounting device 100 is shown in greater detail in FIGS. 2 and 3. It comprises a chimney 200, a washer (or cup) 300, and a bushing 400 forming a spark plug guide. All of these parts are bodies of revolution.

The chimney 200 is in the form of a hollow cylinder having an axis of revolution X-X and possessing two axial ends 202 and 204. A first axial end 202 is for fastening (e.g. by welding) to the outer wall 26 of the combustion chamber in a circular opening 38 formed therein. The second end 204 is free. Between these two ends, there is formed a collar 206 that extends radially towards the inside of the chimney and that is centered on the axis X-X.

The washer 300 is in the form of a flat annulus that is fastened (e.g. by welding) to the second axial end 204 of the chimney 200 so that it also projects radially towards the inside of said chimney.

The washer also includes radial openings 302 formed in its inner periphery. These openings allow air from outside the combustion chamber to cool the free end of the spark plug, as described below. As shown in FIG. 3 and by way of example, there may be five of these openings, and they may be cutouts that are formed regularly all around the inner circumference of the washer.

The bushing 400 forming a spark plug guide has an inner collar 402 positioned at a first axial end, and an outer collar 404 that is axially spaced apart from the inner collar by a portion 406 that is substantially cylindrical. On its entire circumference, this cylindrical portion has a plurality of impact holes 408 opening to the inside of the spark plug guide. The collars are substantially plane, and each of them extends radially outwards. At its second axial end, the spark plug guide has an outwardly flared portion 410.

These various parts are assembled as follows. The chimney 200 is initially fastened to the outer wall 26 of the combustion chamber at its first axial end 202. The spark plug guide 400 is then floatingly mounted inside the chimney with its inner collar 402 bearing against the collar 206 of the chimney. The washer 300 is then fastened to the second axial end 204 of the chimney so as to hold the two collars 402 and 404 of the spark plug guide captive in an annular space 208 defined inside the chimney and defined axially by the collar 206 of the chimney and by the washer 300.

As a result, the total space occupied by the device for mounting the spark plug on the outer wall of the combustion chamber can be greatly reduced. As an indication, the total height H of the device may be about 10 millimeters (mm), in comparison with a prior art device occupying 15 mm. The device of the invention is thus eminently suitable for incorporating in an environment where the distance between the outer wall of the combustion chamber and the outer casing that surrounds it is small.

Furthermore, the outside shape of the device is generally cylindrical, so it is easy to position a cylindrically shaped protector 500 around it (see FIG. 2) in order to use a laser to make multiple perforations in the outer wall 26 of the combustion chamber without that damaging the chimney of the device. Typically, the minimum height of such a protector is about 5 mm.

Once assembled, the operation of the device is as follows. During assembly, the free end of the spark plug 36 is brought into the inside of the spark plug guide 400, with the flared shape of its portion 410 making this operation easier. In operation, the pressure difference that exists between the inside and the outside of the chamber (higher pressure outside the chamber) enables the spark plug guide, and more particularly its inner collar 402, to be pressed against the collar 206 of the chimney, thereby ensuring good airtightness.

In addition, the relative movements that may occur in operation between the outer casing and the outer wall of the combustion chamber are accommodated by the spark plug guide moving in the annular space 208 defined inside the chimney.

Furthermore, in operation, the free end of the spark plug is cooled by impact as follows. The compressed air flowing between the outer casing and the outer wall of the combustion chamber penetrates into the inside space 208 of the chimney by passing through the openings 302 made in the washer. The impact holes 408 made in the cylindrical portion of the spark plug guide lead into this space and they open out to the inside of the spark plug guide so as to ensure that the free end of the spark plug is cooled by impact.

It should be observed that the openings 302 formed in the washer are of dimensions and of positions such that their total flow section is always greater than the total flow section of the impact holes 408 of the spark plug guide, with this applying regardless of the position of the spark plug guide relative to the washer.

With reference to FIG. 2, the various relative dimensions of the parts of the device are specified. In particular, the outer collar 404 of the spark plug guide 400 presents an outside diameter d1 that is greater than the inside diameter d2 of the washer 300 so as to prevent the spark plug guide leaving the chimney in operation. Likewise, the outside diameter d3 of the inner collar 402 of the spark plug guide needs to be greater than the inside diameter d4 of the collar 206 of the chimney.

Advantageously, the radial distance d5 between the inside of the washer 300 and the facing portion of the spark plug guide 400 is greater than the radial distance d6 between the inside of the chimney 200 and the ends of the washers 402 and 404 of the bushing (and in particular the larger of the washers). It is thus possible to avoid any contact between the washer and the spark plug guide in operation so as to avoid any premature wear of the spark plug guide.

Means may also be provided to prevent the spark plug guide 400 from rotating relative to the chimney 200 so as to avoid the spark plug guide becoming worn by friction against the spark plug. For this purpose, and by way of example the spark plug guide may present an inner lug that comes into abutment against a complementary lug of the chimney.

The invention claimed is:

1. A device for mounting a spark plug in a combustion chamber of a gas turbine engine, the device comprising:
   a chimney in the form of a cylinder about an axis X-X and having a first axial end for fastening to a wall of a combustion chamber, said chimney including a collar extending radially inwards and centered on the axis X-X;
   a washer fastened on a second axial end of the chimney opposite from its first end so as to project towards an inside of said chimney; and
   a bushing forming a spark plug guide and including an inner collar and an outer collar that are axially spaced apart from each other by a substantially cylindrical portion, each collar extending radially outwards, said bushing being floatingly mounted inside the chimney with its collars axially positioned between the collar of the chimney and the washer, the inner collar coming in operation to bear against the collar of the chimney, and the outer collar presenting an outside diameter greater than an inside diameter of the washer,
   wherein the cylindrical portion of the bushing has a plurality of impact holes leading into a space defined between the collar of the chimney and the washer and opening out towards an inside of said bushing.

2. The device according to claim 1, wherein the washer has radial openings for allowing air to penetrate into the space defined between the collar of the chimney and the washer.

3. The device according to claim 2, wherein the radial openings in the washer are in the form of cutouts formed in an inner periphery of the washer and regularly distributed all around its circumference.

4. The device according to claim 3, wherein there are five cutouts.

5. The device according to claim 1, wherein a radial distance between an inside of the washer and an outside surface of the bushing is greater than a radial distance between the inside of the chimney and ends of the collars of the bushing.

6. The device according to claim 1, wherein an outside diameter of the inner collar of the bushing is greater than an inside diameter of the collar of the chimney.

7. A combustion chamber of a gas turbine engine, comprising:
   at least one spark plug mounted on a wall of the combustion chamber by the device according to claim 1.

8. A gas turbine engine, comprising:
   the combustion chamber according to claim 7.

* * * * *